(No Model.) 2 Sheets—Sheet 1.
W. H. WIGMORE.
GAS MOTOR ENGINE.
No. 260,513. Patented July 4, 1882.
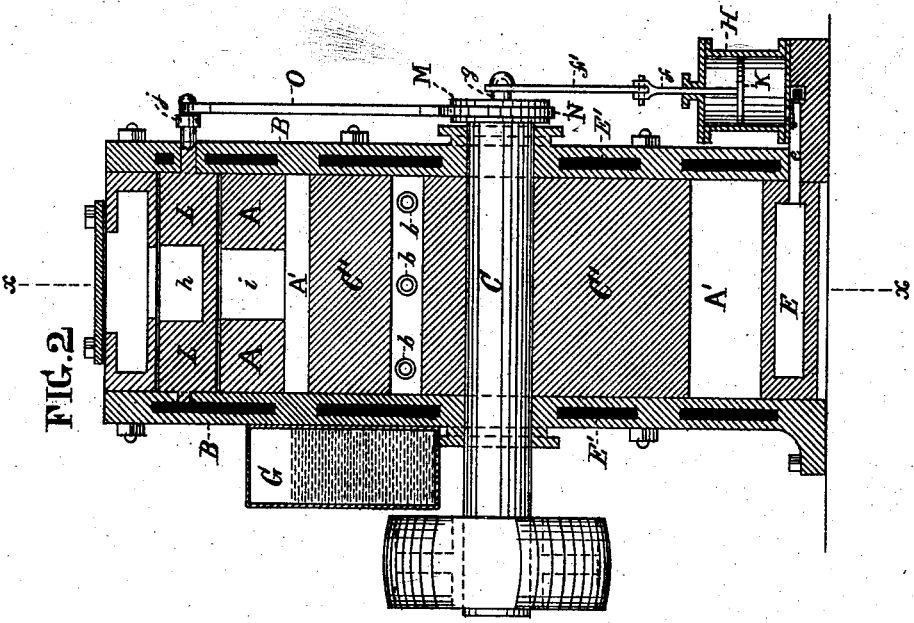
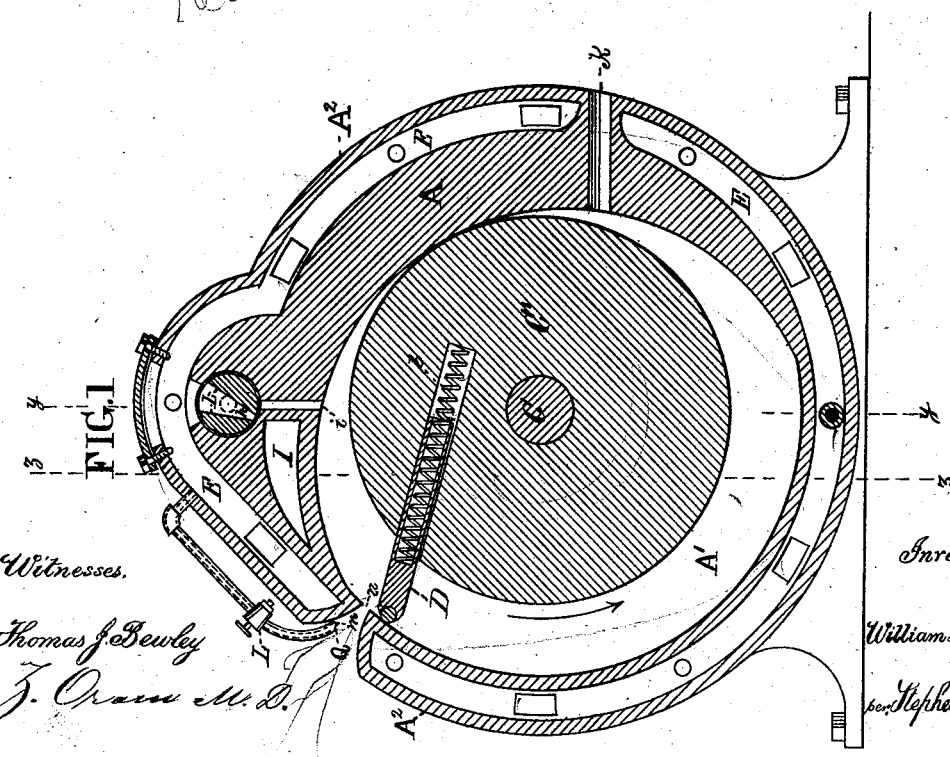
Witnesses.
Thomas J. Bewley
Z. Crane M.D.
Inventor
William H. Wigmore.
per Stephen Ustick att.

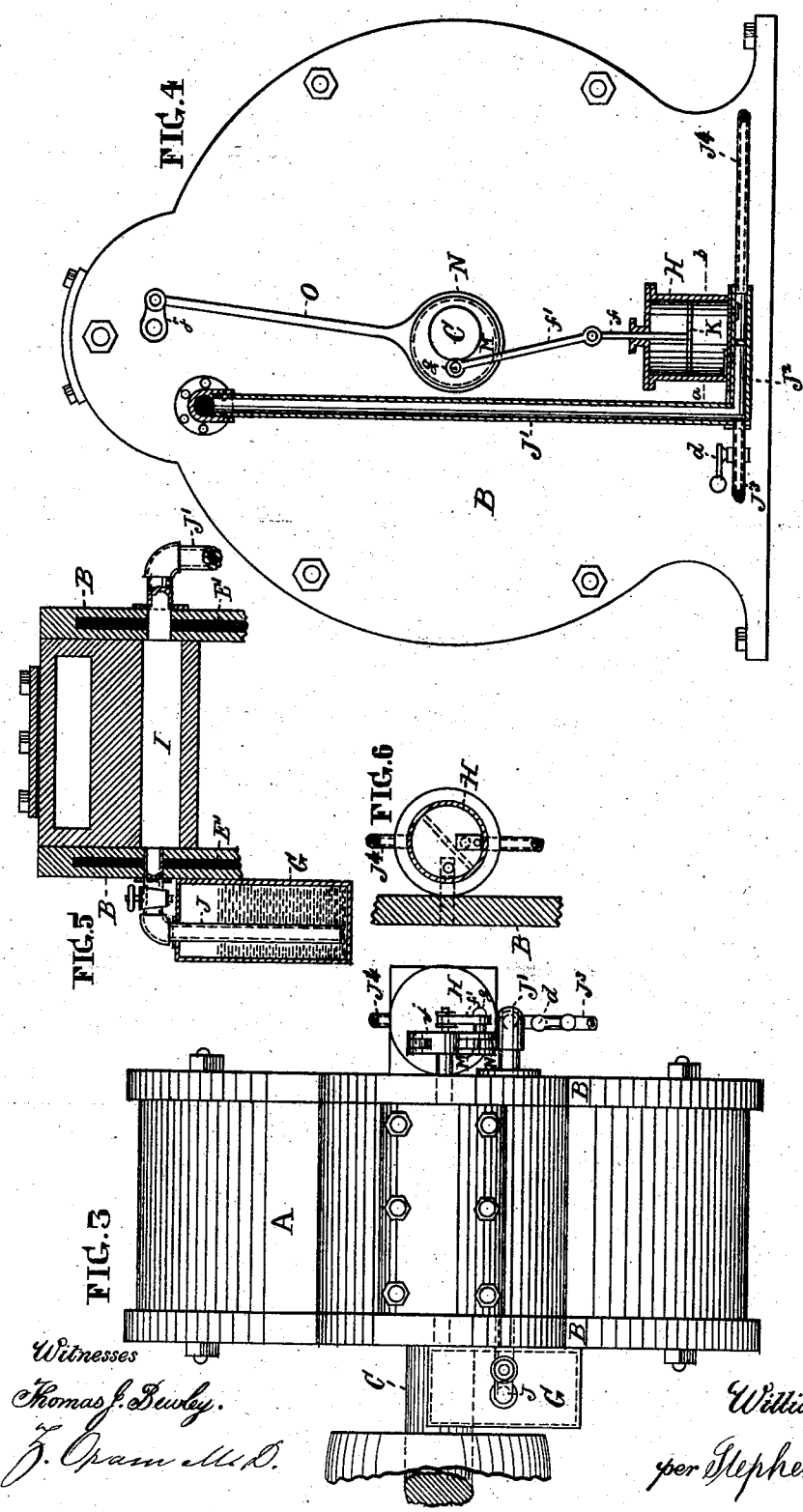

UNITED STATES PATENT OFFICE.

WILLIAM H. WIGMORE, OF PHILADELPHIA, PENNSYLVANIA.

GAS-MOTOR ENGINE.

SPECIFICATION forming part of Letters Patent No. 260,513, dated July 4, 1882.

Application filed August 15, 1881. (No model.)

*To all whom it may concern:*

Be it known that I, WILLIAM H. WIGMORE, a citizen of the United States, residing at Philadelphia, in the county of Philadelphia and State of Pennsylvania, have invented a new and useful Improvement in Gas-Motor Engines, of which the following is a specification.

My invention consists of a combination of devices by which gasoline or other gas-making liquid is drawn by means of a pump into a chamber, where it is generated into gas by means of heat from the cylinder of the engine, and is drawn from said chamber into a pump with a proper proportion of air to insure perfect combustion, and forced from the pump into a surrounding jacket of the cylinder, and by the operation of a valve conducted into the cylinder behind the piston, where it is ignited by means of jets of flames from a gas-burner, which cause combustion and thereby expansion of the gas for the propulsion of the engine.

The invention further consists in the combination, with the engine, of a receiver in which the excess of gas not required for running the engine is stored for illuminating or heating purposes.

As the invention is fully described in the body of the specification, a specific description is omitted in this place.

In the accompanying drawings, which make a part of this specification, Figure 1 is a cross-section of my improved engine at the broken line $x\ x$ of Fig. 2. Fig. 2 is a longitudinal vertical section at the line $y\ y$ of Fig. 1. Fig. 3, Sheet No. 2, is a plan view. Fig. 4 is an end view, partly in section, through the pump H. Fig. 5 is a vertical section of a portion of the upper part of the engine at the line $z\ z$ of Fig. 1. Fig. 6 is a horizontal section at the line $a\ b$ of the pump.

Like letters of reference in all the figures indicate the same parts.

A represents the cylinder of my improved engine, and B B the end plates or housings between which it is bolted.

C is the driving-shaft, and C' the drum, which is provided with a piston, D, which has a friction-roller, $a$, in its outer end. The piston is seated on the springs $b\ b\ b$, (seen in Fig. 1,) to keep the roller in contact with the inner surface of the cylinder as the drum revolves in the direction of the arrow.

Around the cylinder A is a gas jacket or chamber, E, formed by means of the shell $A^2$, the ends of which are jointed to the housings B B. The ends of the cylinder have jackets or chambers E' E'. The engine so far is of similar construction to the one described in my application for Letters Patent for combined gas, air, and steam rotary engine, filed April 23, 1881, and a particular description in this place is therefore deemed unnecessary.

G is a tank for containing gasoline or other gas-making liquid, and H a pump for drawing the liquid into the chamber I, the liquid passing up from the lower part of the tank through the pipe J into the chamber, where it is heated from the cylinder A, causing the generation of gas, which is drawn off through the vertical pipe J' and the horizontal passage $J^2$, connected therewith, into said pump H. With the connected end of the passage $J^2$ there is continued outward a small pipe, $J^3$, through which air passes in sufficient quantity to insure perfect combustion of the gas and mixes with it before it is drawn into the pump, the quantity of air drawn in being regulated by means of a stop-cock, $d$. At each downward stroke of the piston K of the pump the gas is forced through the passage $e$ (seen in Fig. 2) into the annular chamber E of the cylinder A. Any excess of gas which is not required for running the engine passes through the pipe $J^4$ (seen in Fig. 4) into a receiver, to be used for illuminating or heating purposes. The piston K of the pump is operated by means of the connection of its rods $f\ f'$ with the crank-pin $g$, which projects from the eccentric on one end of the shaft C.

L is a rocking valve, which has a V-shaped opening, $h$, for the passage of gas for opening and closing the inlet-port $i$ of the cylinder A, the valve taking the gas from the upper part of the annular chamber E. The opening is made in the form represented in drawings for the purpose of facilitating the flow of the gas to its contracted passage, which connects at the proper time with the inlet-port. The crank $j$ of the valve is operated so as to give the requisite rocking movement to the valve by means of the eccentric M on one end of the shaft C operating through its strap N and rod O, as seen clearly in Fig. 4.

Q is a burner, which receives its supply of gas from the annular chamber E, and is provided with a stop-cock, $l$, for regulating the flow of gas through its nozzle $m$, whereby the flame is injected into the chamber A' of the cylinder, through the conical-shape inlet-opening $n$, for lighting the gas in the cylinder, to cause combustion at the proper time. The nozzle is so shaped as to direct the flame on one side of the inlet, so that when explosion takes place within the cylinder the concussions have a free outlet through the opening, and thus the extinguishing of the flame is avoided.

The operation of the engine is as follows: The engine being started as soon as the liquid in the chamber I becomes heated to a sufficient degree to generate gas, the latter, by the action of the pump H, is drawn into the same through the connecting-pipes and forced into the annular chamber E, and by the operation of the valve L is fed into the annular chamber A' of the cylinder A when the piston D has passed the inlet-port $i$ and is cut off when it reaches the flame-port or inlet-opening $n$ of the flame from the burner Q, as seen in Fig. 1, whereby the gas acts expansively upon the piston until the latter reaches the exhaust-port $k$, where it escapes by the time the piston has reached the inlet-port $i$ and the opening $h$ of the valve has been brought into communication with said port. The gas then flows into the space behind the piston until the latter reaches the flame-port $n$, where it is again cut off by the outlet of the valve passing the inlet-port $i$, as seen in Fig. 1, and the operations are successively continued, as above stated.

I claim as my invention—

1. The combination of the pump H with the chamber I, tank G, and annular chamber E, for drawing gasoline or other gas-making fluid from the tank into the chamber I, and the gas generated in the latter into said pump, and forcing it therefrom into the chamber E, substantially as and for the purpose described.

2. In combination with the pipe $J^2$ and pump H, the pipe $J^3$, whereby at each stroke of the piston K a small quantity of atmospheric air is drawn into said pipe $J^2$, which mixes with the gas contained therein before the latter enters the cylinder A, substantially in the manner and for the purpose set forth.

3. The combination, with a conical inlet of the cylinder of a gas-engine, of a burner having a nozzle so constructed and arranged in relation to the inlet as to throw the flame for igniting the gas in the cylinder in such a manner as to impinge one side of the inlet only, whereby to give a free outlet to the concussions caused by the sudden ignition of the gas, and thus prevent the blowing out of the flame at the nozzle, substantially as described.

WILLIAM H. WIGMORE.

Witnesses:
E. E. BREWER,
R. G. BREWER.